(12) United States Patent
Gordon et al.

(10) Patent No.: US 12,147,416 B2
(45) Date of Patent: Nov. 19, 2024

(54) MANAGING A TRANSACTION ISOLATION

(71) Applicant: VAST DATA LTD., Tel Aviv (IL)

(72) Inventors: Eyal Gordon, Tel Aviv (IL); Asaf Levy, Tel Aviv (IL)

(73) Assignee: VAST DATA LTD., Tel-Aviv (IL)

( * ) Notice: Subject to any disclaimer, the term of this patent is extended or adjusted under 35 U.S.C. 154(b) by 328 days.

(21) Appl. No.: 17/646,295

(22) Filed: Dec. 28, 2021

(65) Prior Publication Data
US 2023/0205759 A1    Jun. 29, 2023

(51) Int. Cl.
*G06F 16/23*      (2019.01)
(52) U.S. Cl.
CPC .............................. *G06F 16/2379* (2019.01)
(58) Field of Classification Search
None
See application file for complete search history.

(56) References Cited

U.S. PATENT DOCUMENTS

| | | | |
|---|---|---|---|
| 11,604,761 B2 | 3/2023 | Khandkar et al. | |
| 11,609,828 B2 | 3/2023 | Khandkar et al. | |
| 2003/0212821 A1* | 11/2003 | Gillies | H04W 40/248 709/238 |
| 2003/0229650 A1* | 12/2003 | Olstad | G06F 16/2358 |
| 2008/0212591 A1* | 9/2008 | Wu | H04L 47/762 370/395.21 |
| 2016/0034356 A1 | 2/2016 | Aron et al. | |
| 2016/0042023 A1* | 2/2016 | Leach | G06F 9/466 707/703 |
| 2019/0065322 A1 | 2/2019 | Chakankar et al. | |
| 2020/0186454 A1 | 6/2020 | Thapliyal | |

* cited by examiner

*Primary Examiner* — Richard L Bowen
(74) *Attorney, Agent, or Firm* — Reches Patents

(57) ABSTRACT

A method for managing a transaction data structure, the method may include (a) receiving, at a first point in time that corresponds to a first value of a clock signal, a request to commit a transaction, and updating a status of the transaction, within the transaction data structure, as being a commit in progress; (b) updating the status of the transaction within the transaction data structure as being committed following (i) a completion of the committing, and (ii) a change of a value of the clock signal from the first value to a second value that differs from the first value; and (c) updating, using a background process, a database segment (DS) version metadata associated with the transaction regarding the completion of the committing. The DS version metadata belongs to a DS version metadata data structure. The DS version metadata data structure and the transaction data structure are selectively accessed during transactions.

24 Claims, 4 Drawing Sheets

```
┌─────────────────────────────────────────────────────────────┐
│ Receiving, at a first point in time that corresponds to a first value of a clock │
│ signal, a request to commit a transaction, and updating a status of the │
│ transaction, within the transaction data structure, as being a commit in │
│ progress. 410 │
└─────────────────────────────────────────────────────────────┘
                              │
                              ▼
┌─────────────────────────────────────────────────────────────┐
│ Updating the status of the transaction within the transaction data structure │
│ as being committed following (i) a completion of the committing, and (ii) a │
│ change of a value of the clock signal from the first value to a second value │
│ that differs from the first value. 420 │
└─────────────────────────────────────────────────────────────┘

┌─────────────────────────────────────────────────────────────┐
│ Updating, using a background process, a database segment (DS) version │
│ metadata associated with the transaction regarding the completion of the │
│ committing. 430 │
└─────────────────────────────────────────────────────────────┘
```

MANAGING A TRANSACTION ISOLATION

TECHNICAL FIELD

The present disclosure generally relates to the field of data storage, and more particularly to managing a transaction isolation.

BACKGROUND

A database transaction is a batch of work that contains one or more SQL statements. A transaction is an atomic unit, so that the same result should be applied to all the SQL statements of the transaction, that can be either all committed (applied to the database) or all rolled back (undone from the database). Committing is performed when a user has explicitly or implicitly requested that the changes in the transaction be made permanent. A user may also issue an explicit Rollback statement.

Database systems that handle transactions are required to keep isolation between transactions, that determines the transaction integrity and visibility to other ongoing transactions. Different levels of isolations define different levels of concurrency and visibility, wherein the visibility defines when the changes made by one transaction become visible to statements of other transactions. For example, when using "read committed" isolation, which is the lowest isolation level, but allows more concurrency, statements can see only those changes made by transactions that were already committed before. When using "repeatable read" isolation, when a transaction reads data of a database object multiple times during the transaction, it will always read the same value for that object. Serializable isolation is the strictest level that reduces concurrency the most.

SUMMARY

There may be provided a storage system, a method and a non-transitory computer readable medium for managing a transaction isolation.

There may be provided a method for managing a transaction data structure, the method may include receiving, at a first point in time that corresponds to a first value of a clock signal, a request to commit a transaction, and updating a status of the transaction, within the transaction data structure, as being a commit in progress; updating the status of the transaction within the transaction data structure as being committed following (i) a completion of the committing, and (ii) a change of a value of the clock signal from the first value to a second value that differs from the first value; and updating, using a background process, a database segment (DS) version metadata associated with the transaction regarding the completion of the committing. The DS version metadata belongs to a DS version metadata data structure. The DS version metadata data structure and the transaction data structure may be selectively accessed during transactions.

The request may be an explicit request.

The request may be an implicit request.

The method may include updating a status of the transaction as being committed in the transaction data structure before updating the DS version metadata to identify the DS version by the DS version commit time stamp that equals the second value.

The transaction data structure may be smaller than an aggregate size of DS version metadata.

The transaction data structure may store transaction metadata regarding currently active transactions and transactions that were recently active.

The updating, using the background process, of the DS version metadata may include replacing an identification of a DS version by a transaction identifier with the identification of the DS version by a DS version commit time stamp that equals the second value.

The method wherein a frequency of the clock signal exceeds ten kilohertz.

There may be provided non-transitory computer readable medium for managing a transaction data structure, the non-transitory computer readable medium may store instructions for: receiving, at a first point in time that corresponds to a first value of a clock signal, a request to commit a transaction, and updating a status of the transaction, within the transaction data structure, as being a commit in progress; updating the status of the transaction within the transaction data structure as being committed following (i) a completion of the committing, and (ii) a change of a value of the clock signal from the first value to a second value that differs from the first value; and updating, using a background process, a database segment (DS) version metadata associated with the transaction regarding the completion of the committing. The DS version metadata belongs to a DS version metadata data structure. The DS version metadata data structure and the transaction data structure may be selectively accessed during transactions.

The non-transitory computer readable medium may store instructions for updating a status of the transaction as being committed in the transaction data structure before updating the DS version metadata to identify the DS version by the DS version commit time stamp that equals the second value.

The transaction data structure may store transaction metadata regarding currently active transactions and transactions that were recently active.

The updating, using the background process, of the DS version metadata may include replacing an identification of a DS version by a transaction identifier with the identification of the DS version by a DS version commit time stamp that equals the second value.

There may be provided a storage system that may include a controller and storage resources; wherein the storage resources may be configured to store a transaction data structure and to store a DS version metadata data structure; wherein the controller may be configured to receive, at a first point in time that corresponds to a first value of a clock signal, a request to commit a transaction, and update a status of the transaction, within the transaction data structure, as being a commit in progress; update the status of the transaction within the transaction data structure as being committed following (i) a completion of the committing, and (ii) a change of a value of the clock signal from the first value to a second value that differs from the first value; and update, using a background process, a database segment (DS) version metadata associated with the transaction regarding the completion of the committing; wherein the DS version metadata belongs to the DS version metadata data structure; and wherein the DS version metadata data structure and the transaction data structure may be selectively accessed during transactions.

The storage system that may store instructions for updating a status of the transaction as being committed in the transaction data structure before updating the DS version metadata to identify the DS version by the DS version commit time stamp that equals the second value.

The storage system wherein the transaction data structure may be smaller than an aggregate size of DS version metadata.

The storage system wherein the updating, using the background process, of the DS version metadata may include replacing an identification of a DS version by a transaction identifier with the identification of the DS version by a DS version commit time stamp that equals the second value.

BRIEF DESCRIPTION OF THE DRAWINGS

The subject matter disclosed herein is particularly pointed out and distinctly claimed in the claims at the conclusion of the specification. The foregoing and other objects, features, and advantages of the disclosed embodiments will be apparent from the following detailed description taken in conjunction with the accompanying drawings.

DETAILED DESCRIPTION

In the following detailed description, numerous specific details are set forth in order to provide a thorough understanding of the invention. However, it will be understood by those skilled in the art that the present invention may be practiced without these specific details. In other instances, well-known methods, procedures, and components have not been described in detail so as not to obscure the present invention.

The subject matter regarded as the invention is particularly pointed out and distinctly claimed in the concluding portion of the specification. The invention, however, both as to organization and method of operation, together with objects, features, and advantages thereof, may best be understood by reference to the following detailed description when read with the accompanying drawings.

It will be appreciated that for simplicity and clarity of illustration, elements shown in the figures have not necessarily been drawn to scale. For example, the dimensions of some of the elements may be exaggerated relative to other elements for clarity. Further, where considered appropriate, reference numerals may be repeated among the figures to indicate corresponding or analogous elements.

Because the illustrated embodiments of the present invention may for the most part, be implemented using electronic components and circuits known to those skilled in the art, details will not be explained in any greater extent than that considered necessary as illustrated above, for the understanding and appreciation of the underlying concepts of the present invention and in order not to obfuscate or distract from the teachings of the present invention.

Any reference in the specification to a method should be applied mutatis mutandis to a device or system capable of executing the method and/or to a non-transitory computer readable medium that stores instructions for executing the method.

Any reference in the specification to a system or device should be applied mutatis mutandis to a method that may be executed by the system, and/or may be applied mutatis mutandis to non-transitory computer readable medium that stores instructions executable by the system.

Any reference in the specification to a non-transitory computer readable medium should be applied mutatis mutandis to a device or system capable of executing instructions stored in the non-transitory computer readable medium and/or may be applied mutatis mutandis to a method for executing the instructions.

Any combination of any module or unit listed in any of the figures, any part of the specification and/or any claims may be provided.

The specification and/or drawings may refer to a controller. The controller can be a processing circuitry, a part of processing circuitry, a virtual machine core, and the like. The processing circuitry may be implemented as a central processing unit (CPU), a graphic processing circuitry (GPU), and/or one or more other integrated circuits such as application-specific integrated circuits (ASICs), field programmable gate arrays (FPGAs), full-custom integrated circuits, etc., or a combination of such integrated circuits.

Any combination of any steps of any method illustrated in the specification and/or drawings may be provided.

Any combination of any subject matter of any of claims may be provided.

Any combinations of systems, units, components, processors, sensors, illustrated in the application may be provided.

A database segment (DS) is a portion of a database that may be mapped to one or more ranges of addresses. The addresses may be logical addresses or physical addresses. The DS may include data of any portion of the database, such as: a table row, a part of a table row, a table column, part of a table column, a table row group, part of a table row group, a column extent, etc.

The database may be associated with database metadata. The database metadata may include associated address ranges, retrieval metadata, version metadata, and the like.

The database metadata may include a database object metadata per each database object, such as a table or index. It is assumed, for simplicity of explanation, that the database metadata or each of the database object metadata is arranged as a hierarchical manner—such as a B-tree that has a root, a first level DSs metadata and leaf database metadata segments. There may be more than two levels. Other structures than a B-tree may be used to store the database metadata.

DSs metadata may be associated with address ranges of a fixed size or of a variable size. The same applies to database sub-segments metadata.

A DS of a certain version may include sub-segments that were amended at the same point in time. Additionally or alternatively—a DS may include at least two sub-segments that were amended at different points of time. The same applies, mutatis mutandis, to sub-segments of different levels.

A data unit refers to data requested in an access request of a transaction. The data unit may include data of one or more DSs, or of one or more database sub-segments.

A data unit may be all or only a part of a DS, or may be all or only be a part of a database sub-segment. A data unit may be related to portions of multiple DSs or multiple database sub-segments.

For example—assuming that a database includes a database object such as a table. Elements of the table may be stored in multiple DSs. Any allocation between table elements and the multiple DSs may be provided. The allocation may virtually segment the table elements to table columns, to column portions, to rows, to row portions, to multi-dimensional segments, and the like. For simplicity of explanation it is assumed that each DS stores one or more versions of a part of a table column.

There are provided systems, methods and non-transitory computer readable medium for managing a transaction isolation.

The management is done based, at least in part, on an applied isolation policy.

A database system isolation policy guarantees that transaction statements see the latest committed version of the data that is available according to the isolation rules, that includes changes that were committed prior to the transaction start time, or the statement start time.

Managing the transactions and isolation of the present invention requires minimal updates to transaction and isolation metadata structures, particularly in the ingest path, i.e., from the time of receiving, from a user of the database, a begin transaction statement (or implicit request for transaction), until acknowledging the commit or rollback statement.

For obtaining an accurate management of timing, the database system employs a high frequency system clock that provides the system timeline that is used for determining transaction commit time, start time and rollback time, and for stamping database segments according to the commit time. The high frequency system clock is implemented by a global counter that is incremented in high frequency, e.g., every 20 microseconds.

The system further handles a transaction data structure that includes a list of transactions, for storing details of active transactions and transactions that were active until recently. Each transaction entry in the list includes transaction information that includes: a transaction identifier, a transaction status, and a transaction time.

The transaction status may include one of the statuses: in-progress, rolled-back, in-commit-process and committed. The transaction identifier is assigned upon the beginning of the transaction. The transaction time may indicate either: the transaction start time—for an active transaction (in-progress or in-commit-process), the rollback time—for a transaction that ended by a rollback, and commit time—for a transaction that was completed (the commit process was completed).

The metadata of each database segment is stamped with either of: (i) a timestamp that indicates the timeline value obtained from the system clock upon completion of a commit of the transaction that wrote the database segment; (ii) a transaction identifier—this is a temporary stamping that indicates a non-committed transaction that updates the DS, or a transaction that was recently committed, but the DS has not yet been stamped with the transaction commit time. The timestamp and the transaction identifier are stored along with the metadata of the DS, that is updated upon writing the DS, and may include other information, such as the DS physical location where the DS is stored.

There are four principal processes related to transactions: transaction start, commit, rollback, and a background (asynchronous) process to update timestamps of DSs that are associated with transaction identifiers rather than timeline values and to clean DSs that are part of a rolled back transaction.

A transaction-start is a process that is executed when a transaction is started (either explicitly with a begin-transaction command, or implicitly by an insert/update/delete statement). The transaction-start process includes the following steps: (i) obtain the current system clock; (ii) assign a transaction identifier and add a transaction entry to the transaction data structure, including the transaction identifier, the state (=in-progress), and the transaction time, which, in this case, is the start time of the transaction.

Each ingest statement of a transaction, is associated with a statement view time, that identifies which data the statement can see. There are two options for the statement view time, depending on the isolation level: (i) when running in the "read committed" mode, the current value of the system clock is used as the statement view time; (ii) when running in the "repeatable read" and "serializable" modes, the statement view time is equal to the transaction's start time, as written in the transaction entry. Statements in the transaction can also see updates by statements from the same transaction.

During the transaction, database segments being read by the transaction are DSs that are associated with a commit time that is not later than the statement view time. DSs being written by the transaction are associated with the transaction identifier of the transaction that performed the writes.

DSs that are associated with a transaction identifier, instead of a time—are not visible to other transactions, as long as the transaction is not committed.

A commit process is performed upon receiving an explicit or implicit request to commit a first transaction, and includes the following operations: (i) changing the transaction state to "commit in progress"; (ii) read the current system clock, t1; (iii) wait for the system clock to advance, e.g., to t2. The value t2 may be larger than t1 by one or more clock ticks; (iv) when the system clock advances—update the transaction entry, with the transaction state set to commit and the transaction time set to the advanced value of the system clock, to indicate the commit time, and send an acknowledgment to the user requested the commit.

It is noted that the commit process does not include changing the metadata of DSs that were changed by the committed transaction, for replacing the transaction identifier to the commit time of the transaction that changed the DS. This is solved temporarily by subsequent read statements, and permanently by an asynchronous cleaning process, as will be described later on. By postponing the replacing of the transaction identifier in the DSs that were changed by the transaction, the latency of transactions is improved.

Waiting for the system clock to advance, so that there is a measurable time difference between the request to commit received from the user and the commit time, helps to avoid cases where a second transaction will ignore part of the changes that were made to DSs by a first transaction, where these DSs are read by the second transaction before the commit of the first transaction, while not ignoring changes made to DSs that were accessed by the second transaction after the commit.

To analyze whether the forcing of the commit time of the first transaction to a time t2 (that is higher than the time of starting the commit process by the first transaction) results—in conforming to strictest isolation rules expected by a host (user computer) that issued the first transaction, it is required to look into the behavior of a statement of a second transaction that read the first transaction's information (transaction time and state) at different times: before, during and after the commit time at t2, as detailed below.

A statement of a second transaction that reads the first transaction's information for the first time, before the commit-in-progress was set, has statement-view-timestamp that is lower or equal to t1, and therefore the second statement was issued before the commit time t2 of the first transaction. Therefore, the statement of the second transaction will not be exposed to the data written by the first transaction, even if it checks again later, after the first transaction is committed and the commit time t2 is set. This is the expected behavior for statements issued before the commit ack to the host that initiated the transaction.

If the second transaction's statement reads the first transaction's information for the first time after the commit-time is set to t2: if the statement-view-timestamp is lower than t2, it was issued before the host that issued the commit got the ack for the commit, in which case the second transaction should never see the updates of the first transaction. If the statement-view-timestamp is equal to or higher than t2, it means that the second transaction's statement was issued after the host issued the commit request (at t1) and therefore the second transaction can see the updates of the first transaction.

If the second statement reads the first transaction's information for the first time while the state of the first transaction is commit-in-progress: if the statement-view-timestamp is lower or equal to t1, the same analysis as above is applied—the second statement was issued before the commit time at t2, and the second statement will not be exposed to the data written by the first transaction.

If the statement-view-timestamp is t2 or higher, the third statement got its statement-view-timestamp after the host issued the commit, i.e., after the beginning of the commit process at t1, and definitely before the host received the ack for the commit. Ultimately the commit time will be set to some value t2. These are two options, both valid in this situation, where the statement was issued after the host issued the commit and before it got the ack: (i) if the commit time is set such that the commit time is higher that the statement-view-timestamp, the statement will never see the content of the commit; (ii) if the commit time is set such that the commit time is lower or equal to the statement-view-timestamp, the statement will always see the content of the commit.

While the transaction is in commit-in-progress state, any statement that inquires about the transaction and needs to check if this transaction is committed or not—will wait until the commit-in-progress is cleared, i.e., the transaction state is changed to committed.

A rollback process is executed upon either of (i) receiving an SQL rollback request, (ii) when it is detected that too much time passed since the transaction start time (which may happen when a compute entity that executed the transaction is failed), (iii) transaction collision is detected (in serializability mode).

The rollback process includes reading the system clock and update the transaction information, by changing the transaction state to rollback and the transaction time to the current system timeline, to indicate the rollback time. The rollback time is to be used by an asynchronous process for cleaning rolled back updates.

It is noted that the rollback process does not need to access the affected DSs, and does not include deleting the DSs' versions that were written by the rolled back transaction. This is solved temporarily by subsequent read statements, and permanently by an asynchronous cleaning process, as will be described later on. By postponing the actual rolling back that includes deletions, the latency of transactions is improved.

When a write statement is performed as part of a transaction, a new version is added for the written DS, and the transaction identifier is added to the metadata of the new version.

When a read statement is performed as part of a transaction, it will select the appropriate version among the versions of the DS to be read. The appropriate version is selected according to the version information in the metadata of the DS and the statement-view-time that is set according to the required isolation level.

The first priority is to select a version of the DS that is stamped with a transaction identifier that is equal to the identifier of the transaction of the read statement, i.e., a DS that was modifies by the current transaction.

If there is a version of the DS that is stamped with a transaction identifier of another transaction, there is a need to check whether the other transaction was completed. The transaction metadata is checked for the state of the other transaction. If the state indicates a committed transaction, the commit time from the transaction data structure is compared to the statement view time, and if it is earlier than the statement view time, it can be a candidate version for the read. Otherwise, if the state indicates a rollback or an in-progress—this version is ignored. If the state indicates that the transaction is during a commit-process, it means that the transaction is about to be committed, within a very short time that it takes the system clock to tick, and the decision about whether or not this version is a candidate—will wait for the transaction to be committed.

For a DS version that is stamped with a timestamp (i.e., a committed version), the timestamp is compared to the statement view time, and if it is earlier than the statement view time, it can be a candidate version for the read. The latest version among the candidate versions will be selected for the read.

An asynchronous process for cleaning DSs is executed in the background for completed transactions, that are either committed or rollback. The cleaning process is responsible for both deleting DS versions that were written by rolled-back transactions, and for stamping DS versions whose transaction was successfully committed, with the transaction commit time. The DS versions handled by the asynchronous cleaning process are those that are still marked with a transaction identifier after the transaction was completed (rolled back or committed).

The cleaning process looks up the database metadata for DS versions that are associated with a transaction identifier. Whenever a DS version that is associated with a transaction identifier is found, the transaction identifier is looked up in the transaction data structure, and if the state indicates a committed transaction, the transaction identifier of the DS version is replaced with the transaction commit time, that is indicated in the transaction entry. If the transaction state indicates a rollback, the DS version is deleted. If the transaction state is in progress and the time elapsed since the transaction time (start time) is above a timeout threshold—the transaction is defined as rollback, and the DS version is deleted. If the transaction state is in progress and the time elapsed since the transaction time (start time) is not above a timeout threshold—the DS version is skipped by this iteration of the cleaning process, and will be handled by the next iteration of the cleaning process. The cleaning process updates the highest handled timeline, according to the highest rollback time or commit time it handled. The highest handled timeline will be the starting point for the next iteration of the cleaning process.

When a cycle of the cleaning process is ended, the transaction entry in the transaction data structure can be canceled if the transaction time commit time/rollback time is earlier than the time of executing the cleaning process. In this case, the corresponding transaction identifier and the transaction entry can be reused for new transactions.

Figure 1:
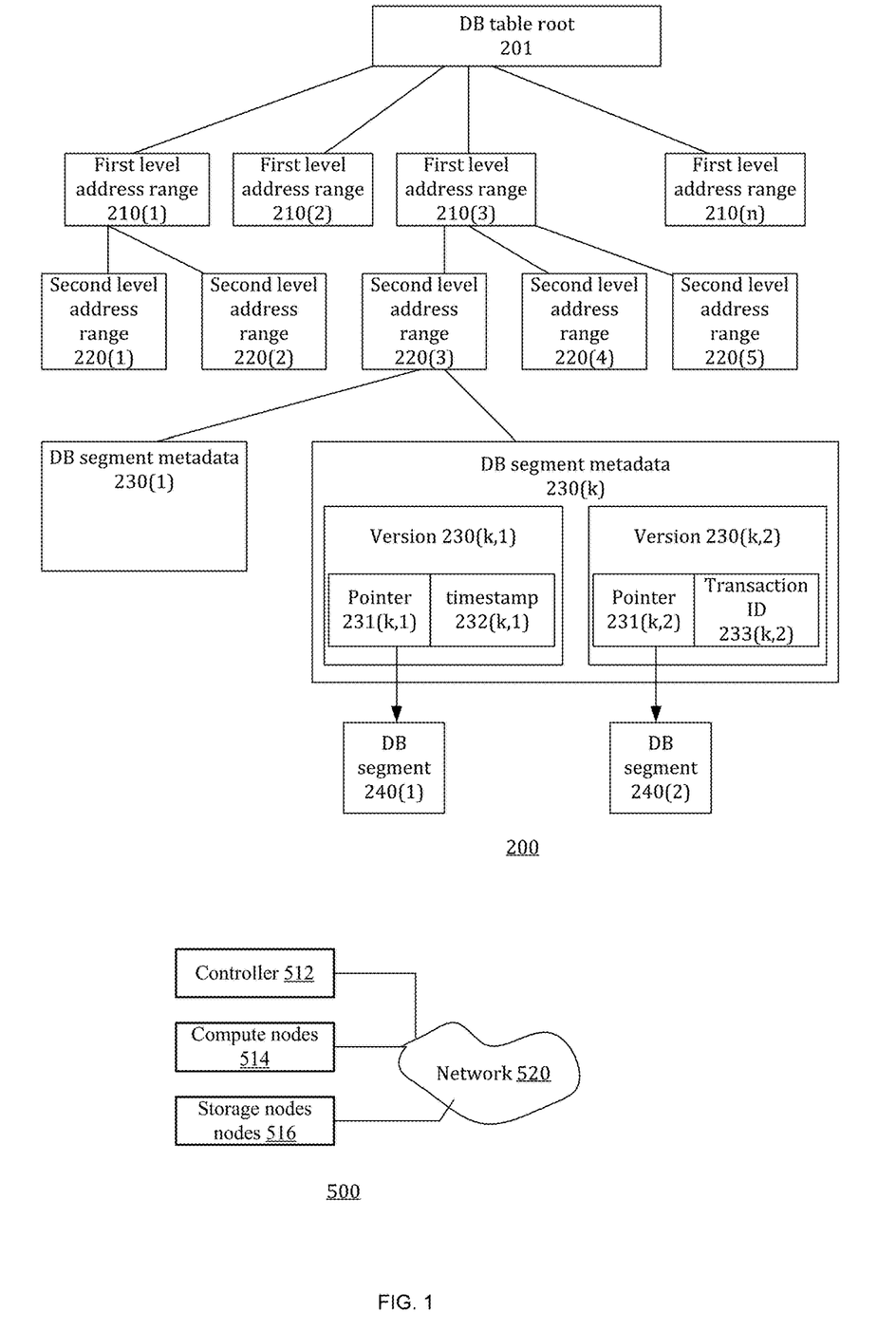
FIG. 1 is an example of a part of a storage system.

FIG. 1 illustrates a mapping metadata structure for mapping logical addresses of a database object such as a table, into physical locations where the data of the table is stored.

In FIG. 1, the mapping metadata is illustrated as a B-tree 200 that includes DB table root 201 that points to first level nodes 210(1)-210(n) that are mapped to first level address ranges. Each first level node may point to one or more second level nodes that are mapped to second level address ranges. For example—first level node 210(1) is mapped to second level nodes 220(1) and 220(2), first level node 210(3) is manned to second level nodes 220(3), 220(4) and 220(5). Second level node 230(3) is mapped DS version metadata 230(1) till 230(k).

A DS is mapped to an address range. The address range may include multiple address sub-ranges. ADS may include one or more database sub-segments (DSSs) that are mapped to one or more address sub-ranges.

There may be more than two levels of nodes and there may be multiple levels of address sub-ranges.

Each DS version metadata may include information of one or more DS versions. For example, DS version metadata 230(k) may include a First DS version metadata 230(k, 1) and a Second DS version metadata 230(k, 2) about a first and a second version of the DS. The DS may have one or at least two versions—and there is a version metadata per version.

Each DS version metadata may include one or more pointers to the location (in the storage system) of the stored DS version. See, for example—pointer 231(k, 1) of the first version of the DS and pointer 231(k,2) of the second version of the DS.

Each DS version metadata may include (or may be otherwise associated with) a commit timestamp or a transaction identifier.

For example, First DS version metadata 230(k,1) includes a timestamp 232(k,1) that includes a commit time of a transaction that wrote DS 240(1). Second DS version metadata 230(k,2) includes a transaction ID 233(k,2) that identifies a transaction that wrote DS 240(2), where the transaction is currently executed or was recently committed. First DS version 240(1) and second DS version 240(2) include different versions of data related to the same DS.

FIG. 1 also illustrates an example of a storage system 500 that has a controller 512, compute nodes 514, storage nodes 516—coupled to one or more networks. The controller may be a part of a compute node, may be implemented by one or more compute nodes, may differ from a compute node and the like. An example of a storage system with compute nodes and storage nodes are illustrated in U.S. patent application Ser. No. 15/804,329 publication serial number US2019/0141128 which is incorporated herein by reference. The storage system is configured to execute at least one of methods 300 and 400 of FIGS. 3 and 4. The storage nodes 516 are an example of storage resources. At least some of the storage resources may belong to the compute nodes 514 and/or to the storage nodes and/or may belong elsewhere in the storage system. The storage resources may store the relational database, the transaction data structure and the DS version metadata data structure.

Figure 2:
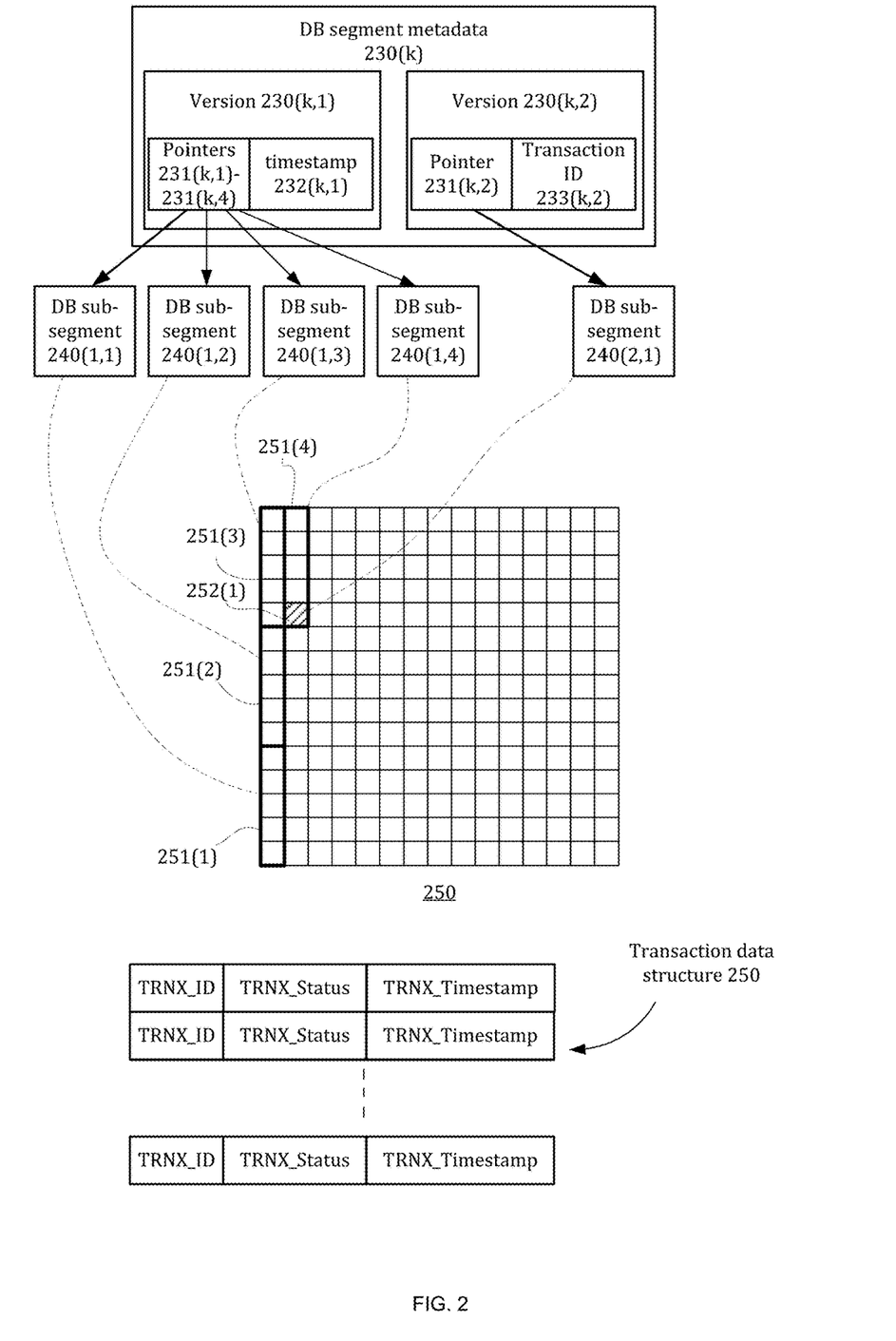
FIG. 2 is an example of data units.

FIG. 2 illustrates an example of a table 250 of a database, of DS metadata and of a transaction data structure 250.

The table includes first till fourth column portions 251(1)-251(4), and a field 252(1) that belongs to the forth column portion 251(4).

It is assumed that the first till third column portions fully belong to the first DB segment version, that fields of the fourth column portion other than field 252(1) belong only to the first version and that field 252(1) has a first version and a second version.

The first DS version metadata 230(k,1) has four pointes 231(k,1)-231(k,4) that point to address sub-ranges that store the first till fourth column portions 251(1)-251(4).

The second DS version metadata 230(k,2) has a pointer 231(k,2) that point to an address sub-range that stores field 252(1).

The transaction data structure includes multiple entries per active transaction and recently active transactions—the entries may include a transaction identifier (TRNX_ID), a transaction status (TRNX_Status) and a transaction timestamp (TRNX_Timestamp).

Figure 3:
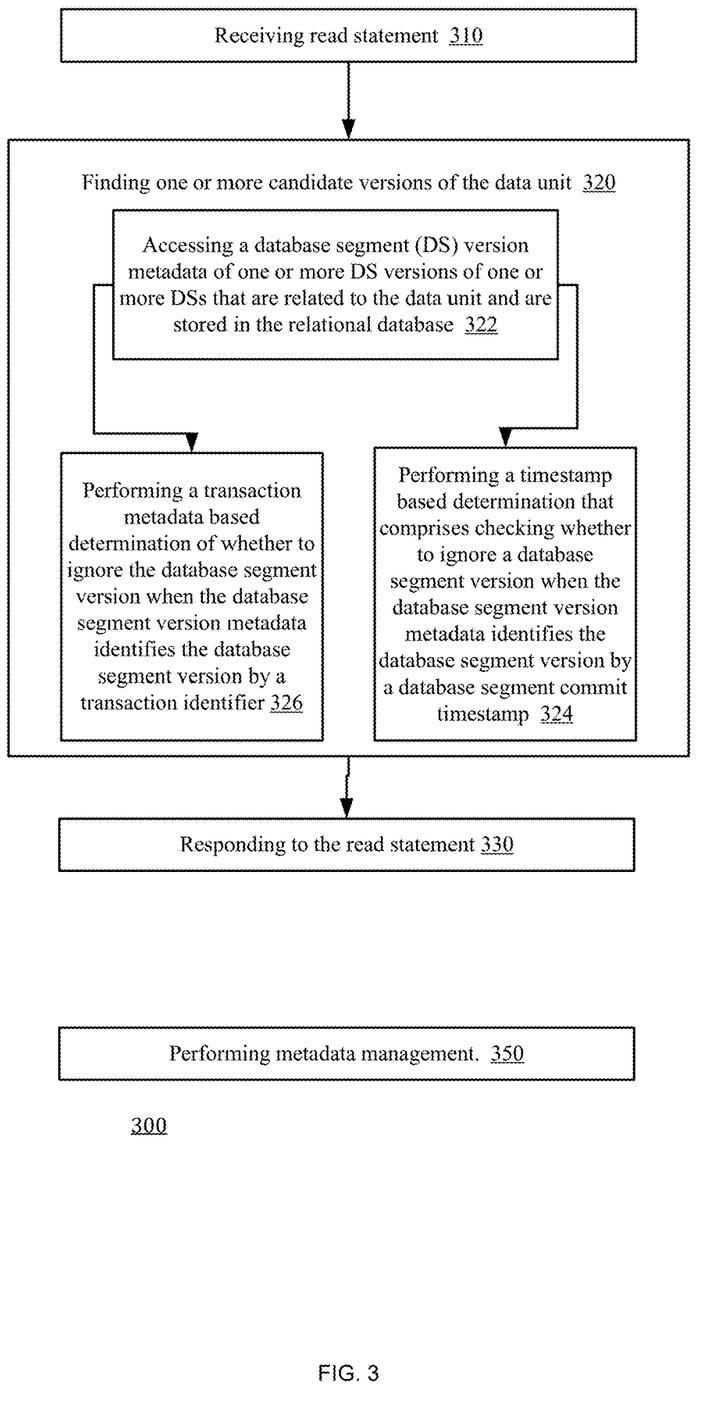
FIG. 3 is an example of a method.

FIG. 3 illustrates method 300 for managing a read statement of a transaction.

Method 300 may start by step 310 of receiving read statement. A storage system or a unit (for example an interface, a communication unit, and the like) of the storage system may receive the read request.

The read statement may be for receiving a data unit that may be stored in a relational database.

The data unit may be stored in a single DS or may include data unit portions that are stored in multiple DSs. Accordingly—the data unit may be related to a single DS or to multiple DSs.

The response to the request may be the latest version of the data unit that is visible (under an applied isolation policy) to the transaction that includes the read statement.

Step 310 may be followed by step 320 of finding one or more candidate versions of the data unit.

A candidate version may be a visible version—according the applied isolation policy.

Step 320 may include step 322 of accessing a database segment (DS) version metadata of one or more DS versions of one or more DSs that are related to the data unit and are stored in the relational database.

Step 322 may include determining whether the database segment version metadata identifies the database segment version by a database segment commit timestamp (and jumping to step 324) or whether the database segment version metadata identifies the database segment version by a transaction identifier (and jumping to step 326).

Step 322 may be followed by step 324 of performing a timestamp based determination that comprises checking whether to ignore a database segment version when the database segment version metadata identifies the database segment version by a database segment commit timestamp. The database segment commit timestamp includes the commit time of the transaction that wrote the database segment version.

Step 324 may be followed by step 330.

Step 322 may be followed by step 326 of performing a transaction metadata based determination of whether to ignore the database segment version when the database segment version metadata identifies the database segment version by a transaction identifier.

A DS version metadata that is associated with the transaction identifier means that according to the DS version metadata—the transaction identified by the transaction identifier is not committed. Nevertheless—this does not mean that that transaction was not committed—as the transaction data structure may provide a more updated indication regarding the status of that transaction.

Step 326 may be followed by step 330.

The output of step 320 is one or more candidate versions of the data unit.

Steps 322, 324 and 326 may be repeated multiple times to provide the one or more candidate versions of the data unit.

The read statement may be associated with a statement view time, and wherein the finding may be based, at least in part, on the statement view time; wherein the statement view time is determined based on an isolation policy.

For example—the statement view time is a time related to an execution of the read statement when applying a read committed isolation policy.

For example—the statement view time is a start time of the transaction when applying at least one of a repeatable read and a serializable isolation policy.

Step 324 may include ignoring the database segment version when the database segment commit timestamp exceeds the statement view time. In this case, the transaction that wrote the database segment version was committed after the statement view time, and therefore the read statement is not allowed to see this version.

Step 326 may include at least one out of:
a. Ignoring the DS version when a transaction that wrote the DS version is denoted as a committed transaction having a transaction commit time that exceeds the statement view time.
b. Accessing a transaction data structure that stores status metadata indicative of statuses of transactions. The transaction status and commit time (if committed) is read from an entry of the transaction data structure that stores the status and commit time of the transaction identified by the transaction identifier that identifies the DS version.
c. Ignoring the DS version when the transaction identified by the transaction identifier is not committed and the transaction is different from a transaction that includes the read statement.

The method comprising identifying, in the DS version metadata, the DS version by the transaction identifier while a transaction associated with the transaction identifier is active. The DS version that is outputted by step 320 may be the DS version candidate that is a most recent visible version of the data unit out of the at least one candidates.

Step 320 may be followed by step 330 of responding to the read statement by out-putting a version of the data unit of the one or more candidate versions of the data unit.

Step 330 may include selecting the version of the data unit out of the one or more candidate versions of the data unit.

The selecting may include providing the latest version of the data unit that is visible (under an applied isolation policy) to the read statement.

The selection may be determined based on the isolation policy, and the statement view time. A visible version may be a version having a commit time that is not later than the statement view time.

The read statement may be associated with a statement view time, and step 320 may be based, at least in part, on an isolation policy, and the statement view time.
a. The statement view time may be a time related to an execution of the read statement (e.g., the start time of the execution) when applying a read committed isolation policy.
b. The statement view time may be a start time of the transaction when applying at least one of a repeatable read and a serializable isolation policy.

Method 300 may include step 350 of performing metadata management.

Step 350 may include performing a background process to replace an identification of a DS by a transaction identifier with the identification of the DS by a DS commit time stamp following a commit of a transaction that may be identified by the transaction identifier.

Step 350 may include updating a status of the transaction as being committed in the transaction data structure before updating the DS version metadata to identify the DS version by the DS version commit timestamp. Updating the status of the transaction in the transaction data structure as being committed is performed upon a commit process, while the updating the DS version metadata to identify the DS version by the DS version commit timestamp takes place as part of the asynchronous background process that fixes DS version metadata of Database segments that were written by committed transaction.

Transaction data structure may be smaller than an aggregate size of DS version metadata related to a database that stores the data unit. The transaction data structure may include no more than few thousands entries (e.g., 1000-10,000) for active or recent active transactions, where each entry includes only few bytes of data for storing the transaction identifier, the state and the time. The DS version metadata may cover the metadata of a table of millions of rows and column or more, where the number of database segments of one table may reach more than a million segments, and even more than a billion segments. One transaction may update the metadata of tens, hundreds, thousands or more segment versions, and therefore, the process of updating all the affected segment versions with the transaction commit time is a time-consuming process that is delayed and handled by the background process.

Step 350 may include performing a background process to replace an identification of a DS version by a transaction identifier with the identification of the DS version by a DS version commit time stamp following a completion of a commit of a transaction that is identified by the transaction identifier.

The updating of the status of a transaction as being committed in the transaction data structure is executed before updating the DS version metadata to identify the DS by the DS commit time stamp. For example—the transaction data structure can be updated immediately (for example in less than a fraction of a millisecond) upon performing a transaction commit process, while the update of the DS version metadata may be much slower, and may be done by a background process that is asynchronous to the transaction commit process. The background process is defined as asynchronous to the transaction commit process, because the acknowledge to the accessing entity (client, application) that requested to commit the transaction, is sent without waiting to the execution of the background process that updates the DS version metadata to indicate the commit time of the committed transaction.

The transaction data structure may store transaction metadata regarding currently active transactions and transactions that were recently active. Recently active—ended within a time period of up to 1 second, up to 10 seconds, up to 1 minute, up to an hour, and the like, and depends on the time it takes for the background process to update the metadata of DS versions that were affected by the recently active transactions. The number of recently active transactions may be limited by an overall size limitation of the transaction data structure. Recently active transactions are transactions that updated DSs whose metadata was not yet updated by the asynchronous background process.

Figure 4:
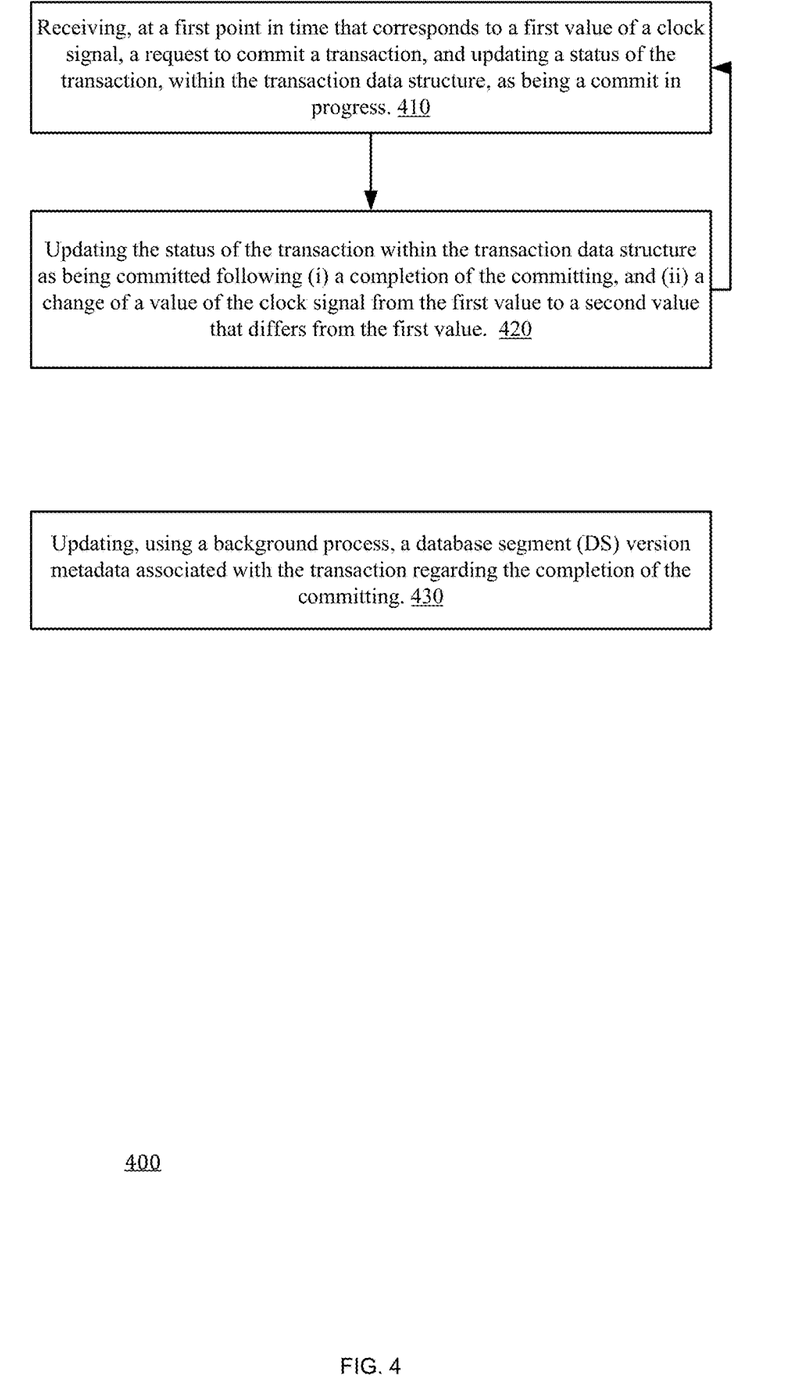
FIG. 4 is an example of a method.

FIG. 4 illustrates method 400 for managing a transaction data structure.

Method 400 may start by step 410 of receiving, at a first point in time that corresponds to a first value of a clock signal, a request to commit a transaction, and updating a status of the transaction, within the transaction data structure, as being a commit in progress.

The request may be an explicit commit request or an implicit request.

Step 410 may be followed by step 420 of updating the status of the transaction within the transaction data structure as being committed following (i) a completion of the committing, and (ii) a change of a value of the clock signal from the first value to a second value that differs from the first value. The second value may be the next possible value after the first value.

Step 420 further includes updating the commit time of the transaction to the second value.

The clock signal may be generated by software (for example by using a counter, whereas the actual system clock may be much faster) and may have a frequency that may exceed ten kilohertz. For example it may range between 10 Khz and 100 Khz, may range between 20 Khz and 1 Mhz, and the like.

Multiple iterations of steps 410 and 420 may be executed for various transactions.

Method 400 may also include step 430 of updating, using a background process, a database segment (DS) version metadata associated with the transaction regarding the completion of the committing.

The background process is slower than the real-time update of the transaction metadata. The background process is performed asynchronously with the committing of the transaction. For example, an acknowledge regarding the committing of the transaction can be issued before the execution of the background process and/or before the background process updates the DS version metadata related to the committed transaction.

The number of active transactions and recently active transaction may be a small fraction (for example less than 0.5, 1, 2, 5, 10 percent and the like) of the number of DSs—and the size of the transaction data structure may also be much smaller than an aggregate size of a DS version metadata data structure.

The transaction data structure is smaller than the DS version metadata.

The transaction data structure may be updated much faster than the DS version metadata. Method 400 may include updating a status of the transaction as being committed in the transaction data structure before updating the DS version metadata to identify the DS by the DS commit time stamp.

The DS version metadata may belong to the DS version metadata data structure.

The DS version metadata may include one or more DS version metadata (cover-ing one or more versions of DS) per DS.

The DS version metadata data structure and the transaction data structure may be accessible (and may be selectively accessed) during transactions. The selecting of the data structure is based on whether the DS version is identified by a transaction identifier or by a commit timestamp.

The transaction data structure may store transaction metadata regarding currently active transactions and transactions that were recently active.

Step 430 may include updating the status of the transaction as being committed in the transaction data structure before updating the DS version metadata to identify the DS version by the DS version commit time stamp that equals the second value.

Step 430 may include replacing an identification of a DS by a transaction identifier with the identification of the DS by a DS commit time stamp that equals the second value.

While the foregoing written description of the invention enables one of ordinary skill to make and use what is considered presently to be the best mode thereof, those of ordinary skill will understand and appreciate the existence of variations, combinations, and equivalents of the specific embodiment, method, and examples herein. The invention should therefore not be limited by the above described embodiment, method, and examples, but by all embodiments and methods within the scope and spirit of the invention as claimed.

In the foregoing specification, the invention has been described with reference to specific examples of embodiments of the invention. It will, however, be evident that various modifications and changes may be made therein without departing from the broader spirit and scope of the invention as set forth in the appended claims.

Those skilled in the art will recognize that the boundaries between logic DSs are merely illustrative and that alternative embodiments may merge logic DSs or circuit elements or impose an alternate decomposition of functionality upon various logic DSs or circuit elements. Thus, it is to be understood that the architectures depicted herein are merely exemplary, and that in fact many other architectures may be implemented which achieve the same functionality.

Any arrangement of components to achieve the same functionality is effectively "associated" such that the desired functionality is achieved. Hence, any two components herein combined to achieve a particular functionality may be seen as "associated with" each other such that the desired functionality is achieved, irrespective of architectures or intermedial components. Likewise, any two components so associated can also be viewed as being "operably connected," or "operably coupled," to each other to achieve the desired functionality.

Any reference to "consisting", "having" and/or "including" should be applied mu-tads mutandis to "consisting" and/or "consisting essentially of".

Furthermore, those skilled in the art will recognize that boundaries between the above described operations merely illustrative. The multiple operations may be combined into a single operation, a single operation may be distributed in additional operations and operations may be executed at least partially overlapping in time. Moreover, alternative embodiments may include multiple instances of a particular operation, and the order of operations may be altered in various other embodiments.

Also for example, in one embodiment, the illustrated examples may be implemented as circuitry located on a single integrated circuit or within a same device. Alternatively, the examples may be implemented as any number of separate integrated circuits or separate de-vices interconnected with each other in a suitable manner.

However, other modifications, variations and alternatives are also possible. The specifications and drawings are, accordingly, to be regarded in an illustrative rather than in a re-strictive sense.

In the claims, any reference signs placed between parentheses shall not be construed as limiting the claim. The word 'comprising' does not exclude the presence of other elements or steps then those listed in a claim. Furthermore, the terms "a" or "an," as used herein, are defined as one or more than one. Also, the use of introductory phrases such as "at least one" and "one or more" in the claims should not be construed to imply that the introduction of another claim element by the indefinite articles "a" or "an" limits any particular claim containing such introduced claim element to inventions containing only one such element, even when the same claim includes the introductory phrases "one or more" or "at least one" and indefinite articles such as "a" or "an." The same holds true for the use of definite articles. Unless stated otherwise, terms such as "first" and "second" are used to arbitrarily distinguish between the elements such terms describe. Thus, these terms are not necessarily intended to indicate temporal or other prioritization of such elements. The mere fact that certain measures are recited in mutually different claims does not indicate that a combination of these measures cannot be used to advantage.

While certain features of the invention have been illustrated and described herein, many modifications, substitutions, changes, and equivalents will now occur to those of ordinary skill in the art. It is, therefore, to be understood that the appended claims are intended to cover all such modifications and changes as fall within the true spirit of the invention.

It is appreciated that various features of the embodiments of the disclosure which are, for clarity, described in the contexts of separate embodiments may also be provided in combination in a single embodiment. Conversely, various features of the embodiments of the disclosure which are, for brevity, described in the context of a single embodiment may also be provided separately or in any suitable sub-combination.

It will be appreciated by persons skilled in the art that the embodiments of the disclosure are not limited by what has been particularly shown and described hereinabove. Rather the scope of the embodiments of the disclosure is defined by the appended claims and equivalents thereof.

The invention claimed is:

1. A method for managing a transaction data structure, the method comprises:
  receiving, at a first point in time that corresponds to a first value of a clock signal, a request to commit a transaction, and updating a status of the transaction, within the transaction data structure, as being a commit in progress;
  waiting for the clock signal to advance, and avoiding an update of the status of the transaction as being committed, while the clock signal is not advanced;
  updating the status of the transaction within the transaction data structure as being committed following (i) a completion of the committing, and (ii) a change of a value of the clock signal from the first value to a second value that differs from the first value; and
  updating, using a background process, a database segment (DS) version metadata associated with the transaction regarding the completion of the committing;
    wherein the DS version metadata belongs to a DS version metadata data structure; and
    wherein the DS version metadata data structure and the transaction data structure are selectively accessed during transactions.

2. The method according to claim 1 wherein the request is an explicit request.

3. The method according to claim 1 wherein the request is an implicit request.

4. The method according to claim 1 comprising updating a status of the transaction as being committed in the transaction data structure before updating the DS version metadata to identify the DS version by the DS version commit time stamp that equals the second value.

5. The method according to claim 1 wherein the transaction data structure is smaller than an aggregate size of DS version metadata.

6. The method according to claim 1 wherein the transaction data structure stores transaction metadata regarding currently active transactions and transactions that were recently active.

7. The method according to claim 1 wherein the updating, using the background process, of the DS version metadata comprises replacing an identification of a DS version by a transaction identifier with the identification of the DS version by a DS version commit time stamp that equals the second value.

8. The method according to claim 1 wherein a frequency of the clock signal exceeds ten kilohertz.

9. A non-transitory computer readable medium for managing a transaction data structure, the at least one non-transitory computer readable medium stores instructions for:
  receiving, at a first point in time that corresponds to a first value of a clock signal, a request to commit a transaction, and updating a status of the transaction, within the transaction data structure, as being a commit in progress;
  waiting for the clock signal to advance, and avoiding an update of the status of the transaction as being committed, while the clock signal is not advanced;
  updating the status of the transaction within the transaction data structure as being committed following (i) a completion of the committing, and (ii) a change of a value of the clock signal from the first value to a second value that differs from the first value; and
  updating, using a background process, a database segment (DS) version metadata associated with the transaction regarding the completion of the committing;
    wherein the DS version metadata belongs to a DS version metadata data structure; and
    wherein the DS version metadata data structure and the transaction data structure are selectively accessed during transactions.

10. The non-transitory computer readable medium according to claim 9 wherein the request is an explicit request.

11. The non-transitory computer readable medium according to claim 9 wherein the request is an implicit request.

12. The non-transitory computer readable medium according to claim 9 that stores instructions for updating a status of the transaction as being committed in the transaction data structure before updating the DS version metadata to identify the DS version by the DS version commit time stamp that equals the second value.

13. The non-transitory computer readable medium according to claim 9 wherein the transaction data structure is smaller than an aggregate size of DS version metadata.

14. The non-transitory computer readable medium according to claim 9 wherein the transaction data structure stores transaction metadata regarding currently active transactions and transactions that were recently active.

15. The non-transitory computer readable medium according to claim 9 wherein the updating, using the background process, of the DS version metadata comprises replacing an identification of a DS version by a transaction identifier with the identification of the DS version by a DS version commit time stamp that equals the second value.

16. The non-transitory computer readable medium according to claim 9 wherein a frequency of the clock signal exceeds ten kilohertz.

17. A storage system that comprises a controller and storage resources;
   wherein the storage resources are configured to store a transaction data structure and to store a DS version metadata data structure;
wherein the controller is configured to
   receive, at a first point in time that corresponds to a first value of a clock signal, a request to commit a transaction, and update a status of the transaction, within the transaction data structure, as being a commit in progress;
   wait for the clock signal to advance, and avoid updating of the status of the transaction as being committed, while the clock signal is not advanced;
   update the status of the transaction within the transaction data structure as being committed following (i) a completion of the committing, and (ii) a change of a value of the clock signal from the first value to a second value that differs from the first value; and
   update, using a background process, a database segment (DS) version metadata associated with the transaction regarding the completion of the committing; wherein the DS version metadata belongs to the DS version metadata data structure; and wherein the DS version metadata data structure and the transaction data structure are selectively accessed during transactions.

18. The storage system according to claim 17 wherein the request is an explicit request.

19. The storage system according to claim 17 wherein the request is an implicit request.

20. The storage system according to claim 17 that stores instructions for updating a status of the transaction as being committed in the transaction data structure before updating the DS version metadata to identify the DS version by the DS version commit time stamp that equals the second value.

21. The storage system according to claim 17 wherein the transaction data structure is smaller than an aggregate size of DS version metadata.

22. The storage system according to claim 17 wherein the transaction data structure stores transaction metadata regarding currently active transactions and transactions that were recently active.

23. The storage system according to claim 17 wherein the updating, using the background process, of the DS version metadata comprises replacing an identification of a DS version by a transaction identifier with the identification of the DS version by a DS version commit time stamp that equals the second value.

24. The storage system according to claim 17 wherein a frequency of the clock signal exceeds ten kilohertz.

* * * * *